United States Patent
Chien et al.

(10) Patent No.: US 11,581,132 B2
(45) Date of Patent: Feb. 14, 2023

(54) MAGNETIC CONDUCTIVE SUBSTRATE AND COIL ASSEMBLY

(71) Applicant: TDK TAIWAN CORP., Taoyuan (TW)

(72) Inventors: Feng-Lung Chien, Taoyuan (TW); Hsiang-Hui Hsu, Taoyuan (TW); Ni-Ni Lai, Taoyuan (TW); Chien-Hung Lin, Taoyuan (TW)

(73) Assignee: TDK TAIWAN CORP, Taoyuan (TW)

( * ) Notice: Subject to any disclaimer, the term of this patent is extended or adjusted under 35 U.S.C. 154(b) by 671 days.

(21) Appl. No.: 16/433,184

(22) Filed: Jun. 6, 2019

(65) Prior Publication Data
US 2020/0075234 A1   Mar. 5, 2020

(30) Foreign Application Priority Data

Aug. 30, 2018   (CN) .......................... 201821413140.1

(51) Int. Cl.
| | |
|---|---|
| *H01F 27/36* | (2006.01) |
| *H01F 38/14* | (2006.01) |
| *H04B 5/00* | (2006.01) |
| *H02J 7/02* | (2016.01) |

(Continued)

(52) U.S. Cl.
CPC .............. *H01F 38/14* (2013.01); *H01F 3/10* (2013.01); *H01F 3/14* (2013.01); *H01F 27/36* (2013.01); *H01F 27/366* (2020.08); *H02J 7/025* (2013.01); *H04B 5/0037* (2013.01); *H04B 5/0075* (2013.01); *H01F 2003/106* (2013.01)

(58) Field of Classification Search
CPC ... H01F 38/14; H01F 3/10; H01F 3/14; H01F 27/36; H01F 27/366; H01F 2003/106; H02J 7/025; H04B 5/0037; H04B 5/0075
See application file for complete search history.

(56) References Cited

U.S. PATENT DOCUMENTS

2014/0177197 A1* 6/2014 Lampinen ............... H01F 27/36
156/60
2014/0239892 A1* 8/2014 Sawa ........................ H01F 3/02
320/108

(Continued)

FOREIGN PATENT DOCUMENTS

| CN | 104900383 B | 4/2017 |
|---|---|---|
| CN | 107230547 A | 10/2017 |

*Primary Examiner* — Mang Tin Bik Lian
(74) *Attorney, Agent, or Firm* — Muncy, Geissler, Olds & Lowe, P.C.

(57) ABSTRACT

A magnetic conductive substrate is provided and is used for wireless charging or wireless communication. The magnetic conductive substrate includes a first magnetic conductive layer, a second magnetic conductive layer, and a third magnetic conductive layer. The first magnetic conductive layer has a first magnetic permeability, the second magnetic conductive layer has a second magnetic permeability, and the third magnetic conductive layer has a third magnetic permeability. The second magnetic conductive layer is disposed between the first magnetic conductive layer and the third magnetic conductive layer, the first magnetic permeability is different from the second magnetic permeability, and the second magnetic permeability is different from the third magnetic permeability.

14 Claims, 10 Drawing Sheets

(51) Int. Cl.
*H01F 3/14* (2006.01)
*H01F 3/10* (2006.01)

(56) References Cited

U.S. PATENT DOCUMENTS

| | | | |
|---|---|---|---|
| 2015/0102892 A1* | 4/2015 | Yeo | H01F 38/14 |
| | | | 336/200 |
| 2015/0123604 A1* | 5/2015 | Lee | H05K 9/0081 |
| | | | 428/307.3 |
| 2016/0055952 A1* | 2/2016 | Watanabe | H01F 10/26 |
| | | | 156/193 |
| 2016/0064814 A1* | 3/2016 | Jang | H05K 9/0075 |
| | | | 174/377 |
| 2016/0134020 A1* | 5/2016 | Adenot Engelvin | H01Q 1/526 |
| | | | 343/842 |
| 2018/0182525 A1* | 6/2018 | Sprentall | H01F 10/14 |
| 2018/0218836 A1* | 8/2018 | Kim | H01F 10/14 |
| 2018/0240582 A1* | 8/2018 | Cho | H01F 1/15358 |
| 2019/0214180 A1* | 7/2019 | Yoon | H02J 50/10 |

* cited by examiner

MAGNETIC CONDUCTIVE SUBSTRATE AND COIL ASSEMBLY

CROSS REFERENCE TO RELATED APPLICATIONS

This application claims the benefit of China Patent Application No. 201821413140.1, filed Aug. 30, 2018, the entirety of which is incorporated by reference herein.

BACKGROUND OF THE INVENTION

Field of the Invention

The application relates to a magnetic conductive substrate, and in particular to a magnetic conductive substrate that includes a magnetic conductive layer with different magnetic permeabilities.

Description of the Related Art

As technology has progressed, many kinds of electronic devices such as tablet computers and smartphones have begun to include the functionality of wireless charging. A user can place the electronic device on a wireless charging transmitting terminal, so that the wireless charging receiving terminal in the electronic device generates current by electromagnetic induction or electromagnetic resonance to charge the battery. Due to the convenience of wireless charging, electronic devices equipped with wireless charging modules have gradually become popular.

In general, a wireless charging device includes a magnetic conductive plate to support a coil. When electricity is applied to the coil and it operates in either a wireless charging mode or a wireless communication mode, the magnetic conductive plate can concentrate the magnetic lines of force emitted from the coil for better performance. In addition, the magnetic conductive substrate can also reduce electromagnetic interference on electronic components on adjacent circuit boards. However, different coils require the use of different magnetic conductive substrates with different magnetic permeabilities to obtain the required operational efficiency, which makes the process of the magnetic conductive substrate more complicated and also increases production cost.

Therefore, how to design a magnetic conductive substrate corresponding to different kinds of coils is a topic nowadays that needs to be discussed and solved.

BRIEF SUMMARY OF INVENTION

Accordingly, one objective of the present disclosure is to provide a wireless device to solve the problems described above.

According to some embodiments of the disclosure, a magnetic conductive substrate is provided and includes a first magnetic conductive layer, a second magnetic conductive layer, and a third magnetic conductive layer. The first magnetic conductive layer has a first magnetic permeability, the second magnetic conductive layer has a second magnetic permeability, and the third magnetic conductive layer has a third magnetic permeability. The second magnetic conductive layer is disposed between the first magnetic conductive layer and the third magnetic conductive layer, the first magnetic permeability is different from the second magnetic permeability, and the second magnetic permeability is different from the third magnetic permeability.

According to some embodiments, the first magnetic conductive layer, the second magnetic conductive layer and the third magnetic conductive layer have the same thickness.

According to some embodiments, the first magnetic conductive layer has a plurality of first magnetic conductive units, and the second magnetic conductive layer has a plurality of second magnetic conductive units, wherein an extending direction is defined by the first magnetic conductive layer and the second magnetic conductive layer, and an average size of the first magnetic conductive units is different from an average size of the second magnetic conductive units in the extending direction.

According to some embodiments, the first magnetic conductive layer has a plurality of first magnetic conductive units, the second magnetic conductive layer has a plurality of second magnetic conductive units, and a distribution density of the first magnetic conductive units is different from a distribution density of the second magnetic conductive units.

According to some embodiments, the first magnetic conductive layer and the second magnetic conductive layer are integrally formed.

According to some embodiments, the first magnetic conductive layer has a plurality of first gaps, and the second magnetic conductive layer has a plurality of second gaps. A thickness direction is defined by the first magnetic conductive layer, and when viewed along the thickness direction, the first gaps and the second gaps are arranged in a staggered manner.

According to some embodiments, each of the first magnetic permeability, the second magnetic permeability, and the third magnetic permeability range from 200 to 1200.

According to some embodiments, each of the first magnetic permeability, the second magnetic permeability, and the third magnetic permeability range from 450 to 850.

According to some embodiments, the thickness of the first magnetic conductive layer is less than 50 µm, the thickness of the second magnetic conductive layer is less than 50 µm, and the thickness of the third magnetic conductive layer is less than 50 µm.

According to some embodiments of the disclosure, a coil assembly is provided and includes a magnetic conductive substrate and a coil. The magnetic conductive substrate includes a first magnetic conductive layer, a second magnetic conductive layer, and a third magnetic conductive layer. The first magnetic conductive layer has a first magnetic permeability, the second magnetic conductive layer has a second magnetic permeability, and the third magnetic conductive layer has a third magnetic permeability. The second magnetic conductive layer is disposed between the first magnetic conductive layer and the third magnetic conductive layer, the first magnetic permeability is different from the second magnetic permeability, and the second magnetic permeability is different from the third magnetic permeability. The coil is disposed on the first magnetic conductive layer.

According to some embodiments, the first magnetic permeability is greater than each of the second magnetic permeability and the third magnetic permeability.

According to some embodiments, the third magnetic permeability is greater than each of the first magnetic permeability and the second magnetic permeability.

According to some embodiments, the second magnetic permeability is greater than each of the first magnetic permeability and the third magnetic permeability.

According to some embodiments, the second magnetic permeability is smaller than each of the first magnetic permeability and the third magnetic permeability.

According to some embodiments, the magnetic conductive substrate is made of a nanocrystalline material or ferrite.

According to some embodiments, the magnetic conductive substrate further includes a plurality of adhesive layers, and the first, second and third magnetic conductive layers are connected to each other by the adhesive layers.

The present disclosure provides a magnetic conductive substrate having three or more magnetic conductive layers, and the magnetic permeability of each of the magnetic conductive layers can be designed to be different. When the magnetic conductive layers having different magnetic permeabilities are stacked into a magnetic conductive substrate, the magnetic permeability of the entire magnetic conductive substrate can be arbitrarily adjusted according to requirements. With this design, the magnetic conductive substrate having a specific magnetic permeability can be implemented by simply using the magnetic conductive layers with different magnetic permeabilities, without additionally using a more complicated process to implement the magnetic conductive substrate. Therefore, the process can be simplified and the production cost can be reduced.

In addition, in the process of manufacturing the magnetic conductive substrate, the magnetic conductive layers are pressed to generate a plurality of gaps. By adjusting the positions of the gaps, the magnetic permeability of each of the magnetic conductive layers can be changed, and the magnetic permeability of the entire magnetic conductive substrate can be adjusted. Furthermore, the gaps of the different magnetic conductive layers are arranged in a staggered manner, so that the problem of magnetic leakage of the magnetic conductive substrate can be avoided.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF INVENTION

Figure 1:
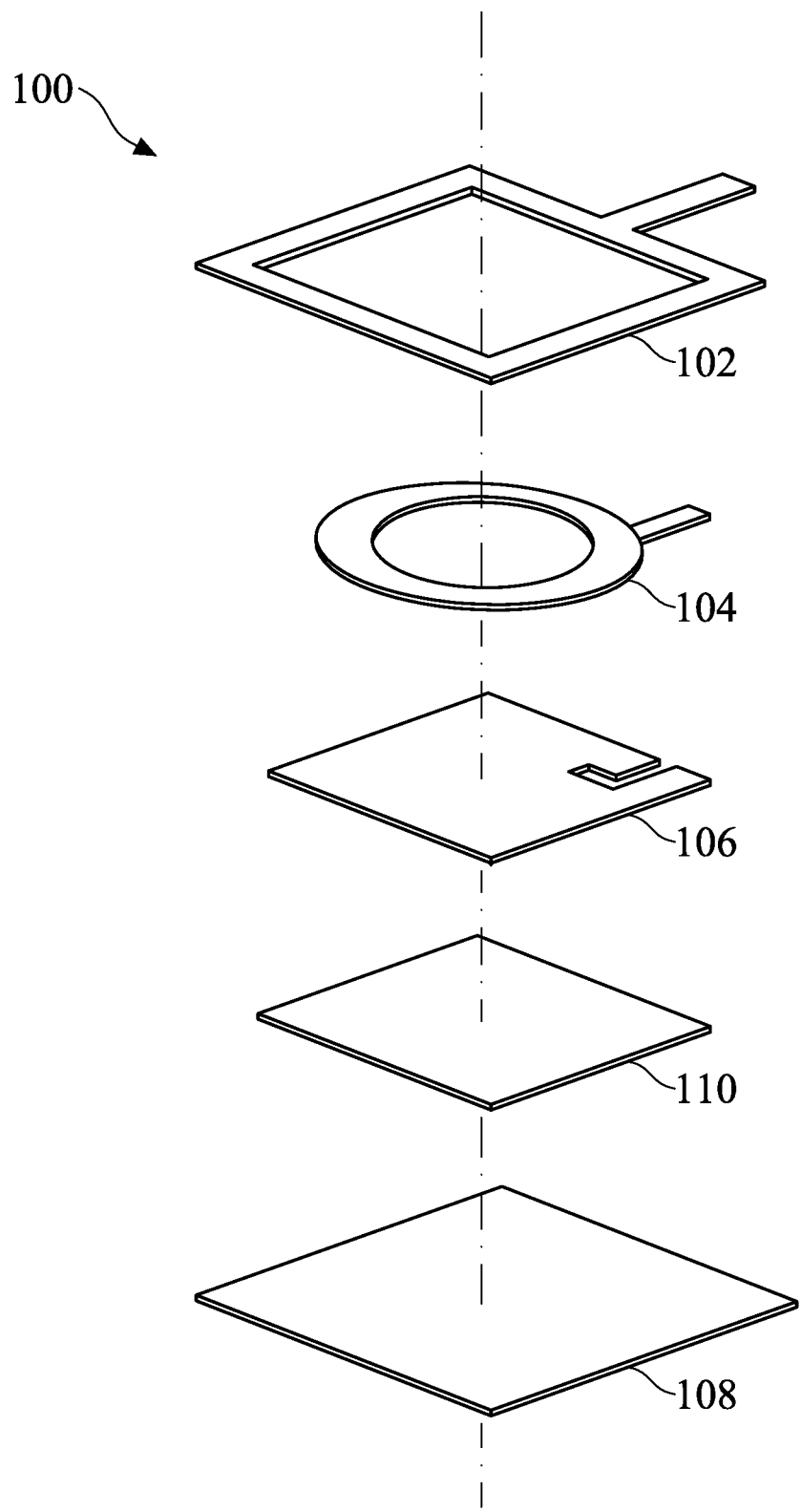
FIG. 1 is an exploded diagram of a wireless device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any form with which a skilled person is familiar. In addition, when a layer is "above" other layers or a substrate, it might be "directly" on the layers or the substrate, or some other layers may be between the layer and the other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is an exploded diagram of a wireless device 100 according to an embodiment of the present disclosure. As shown in FIG. 1, the wireless device 100 can include a flexible circuit board 102, a wireless charging coil 104, an adhesive layer 106, a first magnetic conductive substrate 108 and a second magnetic conductive substrate 110. In this embodiment, the second magnetic conductive substrate 110 is disposed on the first magnetic conductive substrate 108, and the flexible circuit board 102 and the wireless charging coil 104 are fixed on the first magnetic conductive substrate 108 by the adhesive layer 106.

The flexible circuit board 102 may have one or more metal wires therein to form a circuit pattern to serve as another charging coil. For example, the charging coil of the flexible circuit board 102 can operate as a resonant charging coil based on the standard of the Alliance for Wireless Power (A4WP), but it is not limited thereto. In addition, the wireless charging coil 104 can operate as an inductive charging coil based on the standard of Wireless Power Consortium (WPC), such as the Qi standard. The wireless device 100 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first magnetic conductive substrate 108 and the second magnetic conductive substrate 110 may be made of a nanocrystalline material or ferrite, and they have different magnetic permeability (also called magnetic permeabilities). Specifically, the magnetic permeability of the first magnetic conductive substrate 108 corresponds to the charging coil in the flexible circuit board 102, and the magnetic permeability of the second magnetic conductive substrate 110 corresponds to the wireless charging coil 104.

Figure 2:
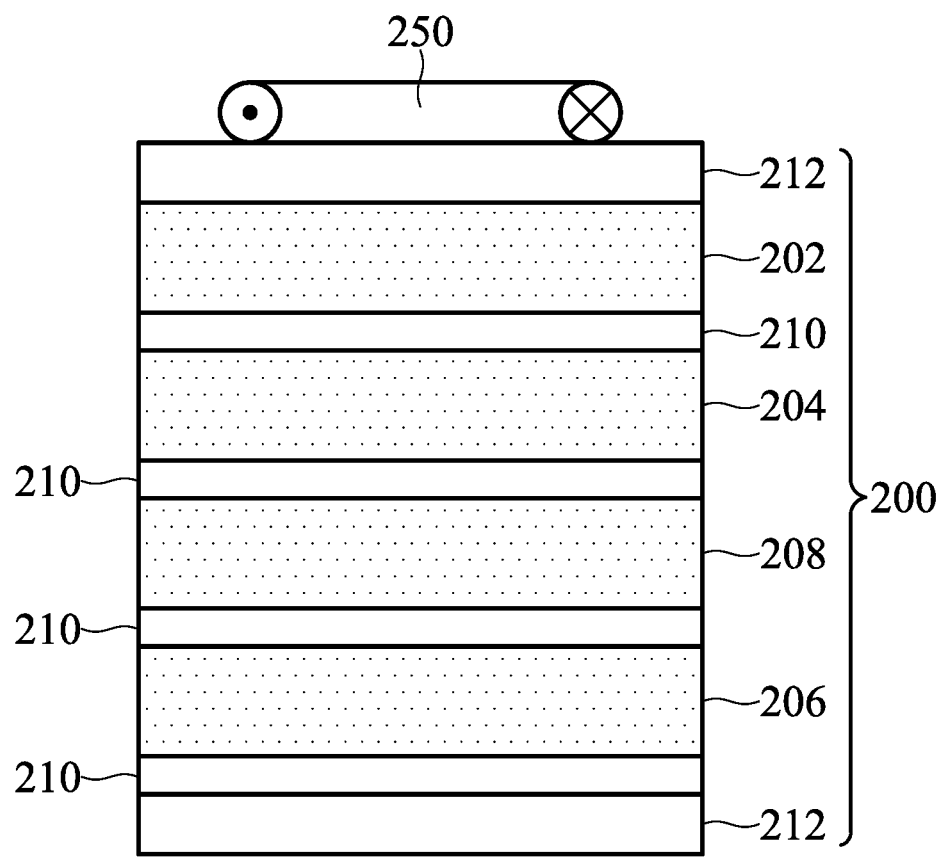
FIG. 2 is a schematic structural diagram of a magnetic conductive substrate according to some embodiments of the present disclosure.

Next, please refer to FIG. 2, which is a schematic structural diagram of a magnetic conductive substrate 200 according to some embodiments of the present disclosure. In this embodiment, the magnetic conductive substrate 200 is similar to the first magnetic conductive substrate 108 or the second magnetic conductive substrate 110 and can be used for wireless charging, and it can also be used for wireless communication in other embodiments. As shown in FIG. 2, the magnetic conductive substrate 200 may include a first magnetic conductive layer 202, a second magnetic conductive layer 204, a third magnetic conductive layer 206, and a fourth magnetic conductive layer 208, but it is not limited thereto. The magnetic conductive substrate 200 can include more or fewer magnetic conductive layers in other embodiments. In addition, the magnetic conductive substrate 200 may also include a plurality of adhesive layers 210 and two insulating layers 212. The magnetic conductive layers may be connected to each other by the adhesive layer 210, and the insulating layers 212 are located on the upper side and lower side of the magnetic conductive layers so as to protect the magnetic conductive layers.

In this embodiment, the first magnetic conductive layer 202, the second magnetic conductive layer 204, the third magnetic conductive layer 206, and the fourth magnetic conductive layer 208 each have a thickness of less than 50 µm, and they all have the same thickness, such as 20 µm. In addition, the thickness of the adhesive layer 210 may range from 3 to 10 µm. It should be noted that, in some embodiments, the adhesive layer 210 may be omitted in the magnetic conductive substrate 200 to reduce the overall thickness of the magnetic conductive substrate 200. In some embodiment, the first magnetic conductive layer 202, the second magnetic conductive layer 204, the third magnetic conductive layer 206, and the fourth magnetic conductive layer 208 may have different thicknesses.

In this embodiment, the second magnetic conductive layer 204 is disposed between the first magnetic conductive layer 202 and the third magnetic conductive layer 206, and the fourth magnetic conductive layer 208 is disposed between the second magnetic conductive layer 204 and the third magnetic conductive layer 206. The first magnetic conductive layer 202 has a first magnetic permeability, the second magnetic conductive layer 204 has a second magnetic permeability, the third magnetic conductive layer 206 has a third magnetic permeability, and the fourth magnetic conductive layer 208 has a fourth magnetic permeability. In this embodiment, the first, second, third, and fourth magnetic permeabilities range from 200 to 1200, and can be used for wireless communication and wireless charging. Additionally, in some embodiments, the first, second, third, and fourth magnetic permeabilities range from 450 to 850, and are preferably used for wireless charging.

Furthermore, as shown in FIG. 2, a coil 250 may be disposed on the magnetic conductive substrate 200. The coil 250 is disposed on the first magnetic conductive layer 202, and a coil assembly is defined to include the coil 250 and the magnetic conductive substrate 200. In this embodiment, each of the second magnetic permeability and the fourth magnetic permeability is smaller than each of the first magnetic permeability and the third magnetic permeability. For example, each of the first magnetic permeability and the third magnetic permeability is 800, and each of the second magnetic permeability and the fourth magnetic permeability is 350. Based on this structural configuration, the overall magnetic permeability of the magnetic conductive substrate 200 can be between 680 and 700, corresponding to the coil 250, and can be applied in the field of wireless charging. Specifically, the charge conversion efficiency of the magnetic conductive substrate 200 and the coil 250 can reach 87.22%. The magnetic conductive substrate 200 can make the charging conversion efficiency of the coil 250 higher than that of a conventional magnetic conductive substrate consisting of plurality of magnetic conductive layers with the same magnetic permeability.

In addition, in other embodiments, each of the first magnetic permeability and the third magnetic permeability is 600, each of the second magnetic permeability and the fourth magnetic permeability is 350, and the overall magnetic permeability of the magnetic conductive substrate may be between 680 and 710.

Figure 3:
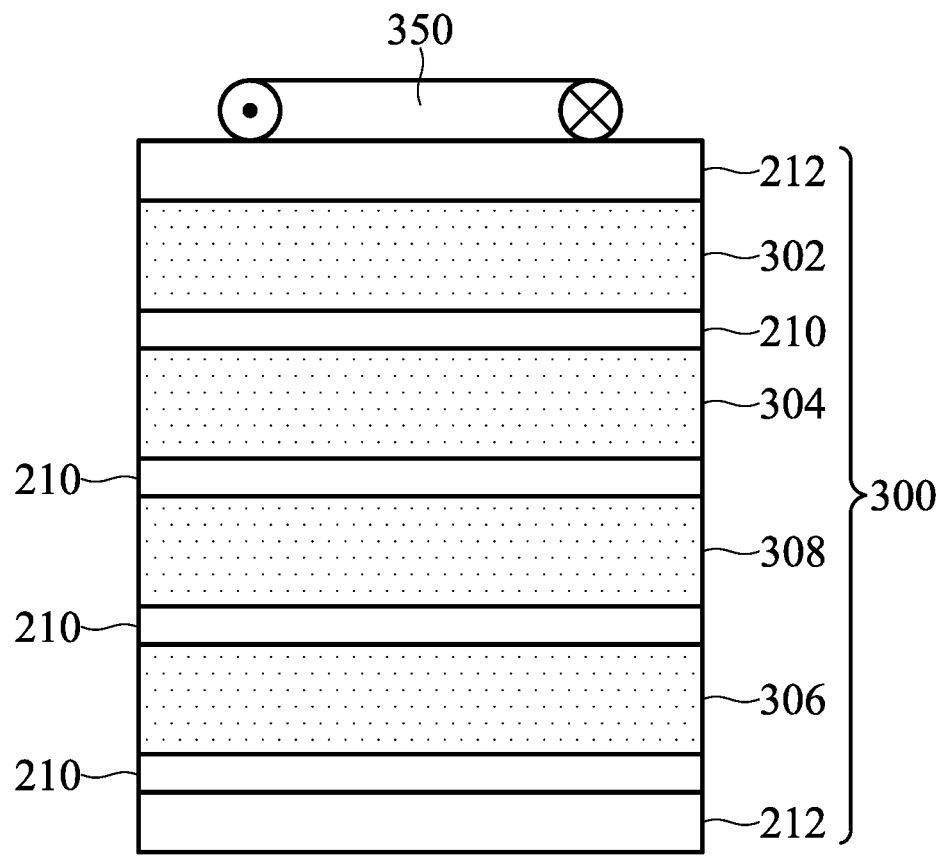
FIG. 3 is a schematic structural diagram of a magnetic conductive substrate according to another embodiment of the present disclosure.

Please refer to FIG. 3, which is a schematic structural diagram of a magnetic conductive substrate 300 according to another embodiment of the present disclosure. In this embodiment, the first magnetic conductive layer 302 has a first magnetic permeability, the second magnetic conductive layer 304 has a second magnetic permeability, the third magnetic conductive layer 306 has a third magnetic permeability, and the four magnetic conductive layer 308 has a fourth magnetic permeability. The magnetic conductive substrate 300 is similar to the magnetic conductive substrate 200, and their difference is that in the magnetic conductive substrate 300 of this embodiment, each of the second magnetic permeability and the fourth magnetic permeability is greater than each of the first magnetic permeability and the third magnetic permeability. For example, each of the first magnetic permeability and the third magnetic permeability is 350, and each of the second magnetic permeability and the fourth magnetic permeability is 800. Based on this configuration, the overall magnetic permeability of the magnetic conductive substrate 300 may be between 685 and 760, corresponding to a coil 350.

Figure 4:
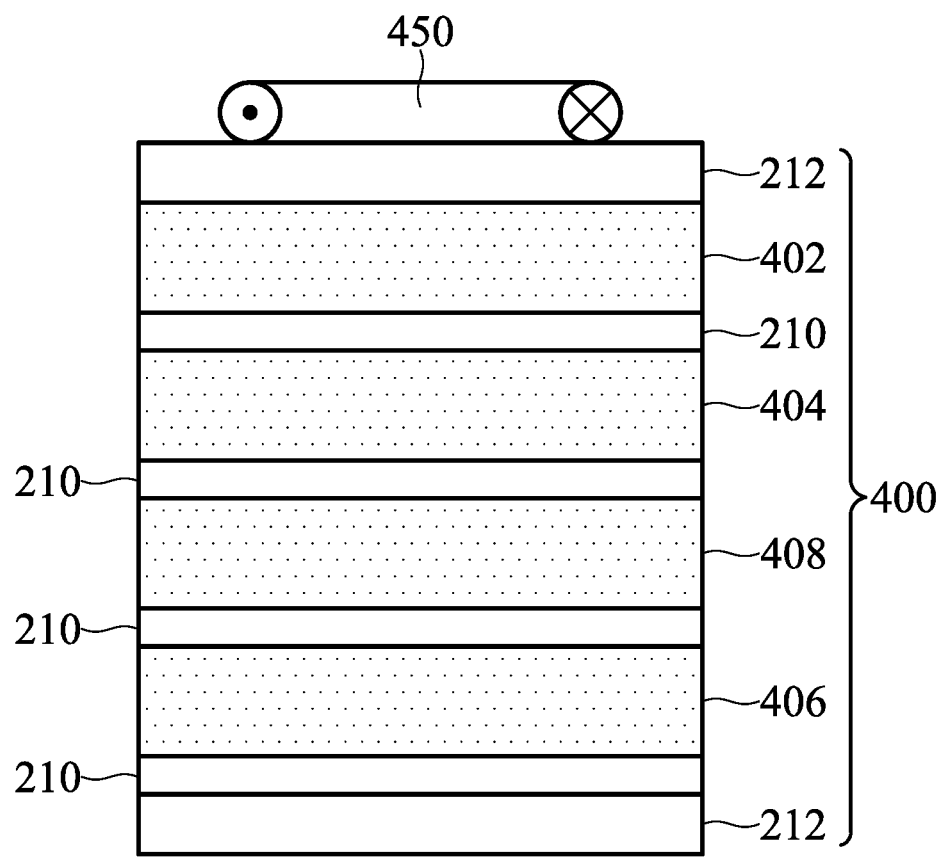
FIG. 4 is a schematic structural diagram of a magnetic conductive substrate according to another embodiment of the present disclosure.

Please refer to FIG. 4, which is a schematic structural diagram of a magnetic conductive substrate 400 according to another embodiment of the present disclosure. In this embodiment, the first magnetic conductive layer 402 has a first magnetic permeability, the second magnetic conductive layer 404 has a second magnetic permeability, the third magnetic conductive layer 406 has a third magnetic permeability, and the four magnetic conductive layer 408 has a fourth magnetic permeability. The magnetic conductive substrate 400 is similar to the magnetic conductive substrate 200, and their difference is that, in the magnetic conductive substrate 400 of this embodiment, the third magnetic permeability is greater than each of the first magnetic permeability, the second magnetic permeability and the fourth magnetic permeability. For example, the third magnetic permeability is 1000, the first magnetic permeability is 350, the second magnetic permeability is 600, and the fourth magnetic permeability is 800. Based on this configuration, the overall magnetic permeability of the magnetic conductive substrate 400 can be between 770 and 815, corresponding to a coil 450.

Figure 5:
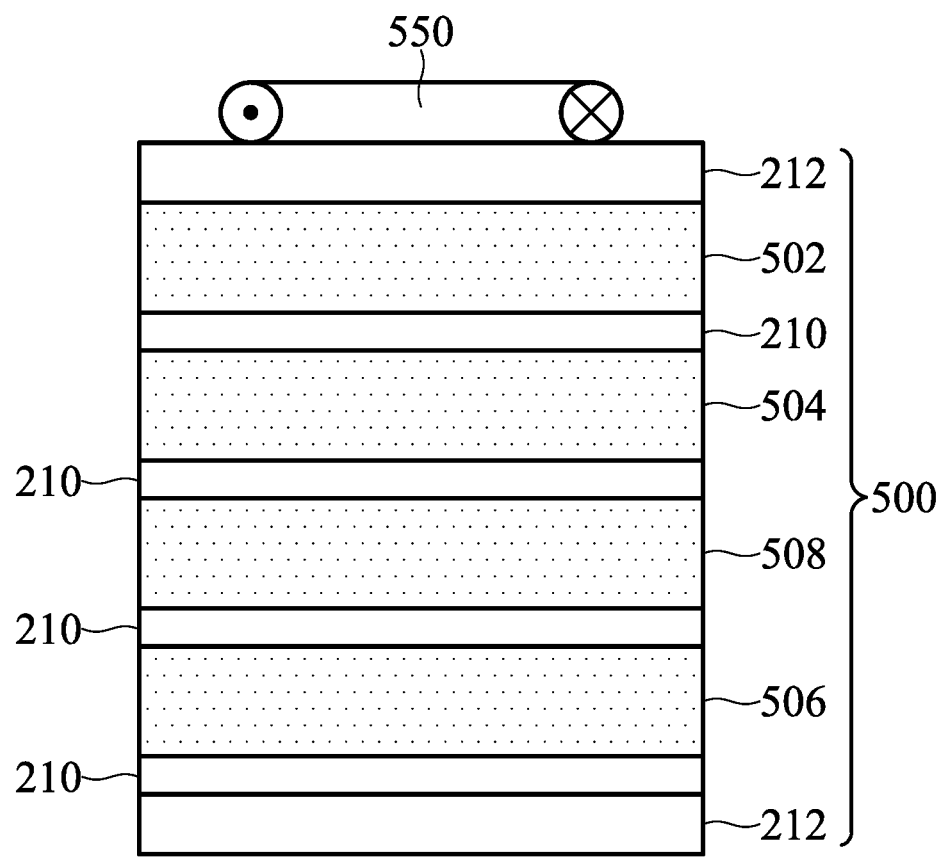
FIG. 5 is a schematic structural diagram of a magnetic conductive substrate according to another embodiment of the present disclosure.

Please refer to FIG. 5, which is a schematic structural diagram of a magnetic conductive substrate 500 according to another embodiment of the present disclosure. In this embodiment, the first magnetic conductive layer 502 has a first magnetic permeability, the second magnetic conductive layer 504 has a second magnetic permeability, the third magnetic conductive layer 506 has a third magnetic permeability, and the four magnetic conductive layer 508 has a fourth magnetic permeability. The magnetic conductive substrate 500 is similar to the magnetic conductive substrate 200, and their difference is that, in the magnetic conductive substrate 500 of this embodiment, the first magnetic permeability is greater than each of the second magnetic permeability, the third magnetic permeability and the fourth magnetic permeability. For example, the first magnetic permeability is 1000, the second magnetic permeability is 800, the third magnetic permeability is 350, and the fourth magnetic permeability is 600. Based on this configuration, the overall magnetic permeability of the magnetic conductive substrate 500 may be between 770 and 815, corresponding to a coil 550.

The magnetic conductive substrate of the present disclosure is formed by stacking magnetic conductive layers having different magnetic permeabilities, so as to adjust the magnetic permeability of the entire magnetic conductive substrate. With this design, the magnetic conductive substrate having a specific magnetic permeability can be implemented by simply using the magnetic conductive layers with different magnetic permeabilities, without additionally using a more complicated process to implement the magnetic conductive substrate having the specific magnetic permeability. Therefore, the process can be simplified and the production cost can be reduced. Furthermore, the magnetic conductive substrate of the present disclosure can make the operation efficiency of the coil (such as the coil 250) better than the conventional magnetic conductive substrate consisting of plurality of magnetic conductive layers with the same magnetic permeability. In addition, because the magnetic permeability of the entire magnetic conductive substrate of the present disclosure can be adjusted, it is possible to correspond to different coils and to make the operation efficiency of different coils better.

Figure 6:
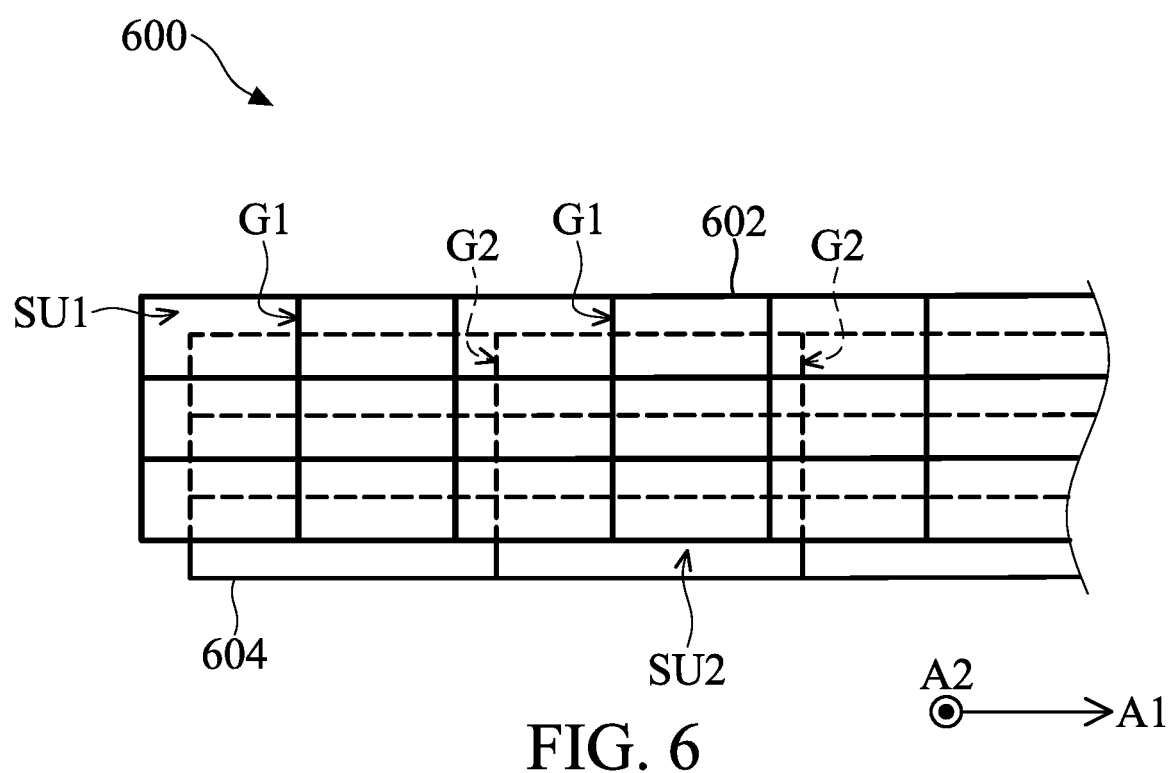
FIG. 6 is a top view of a magnetic conductive substrate according to an embodiment of the present disclosure.
Figure 7:
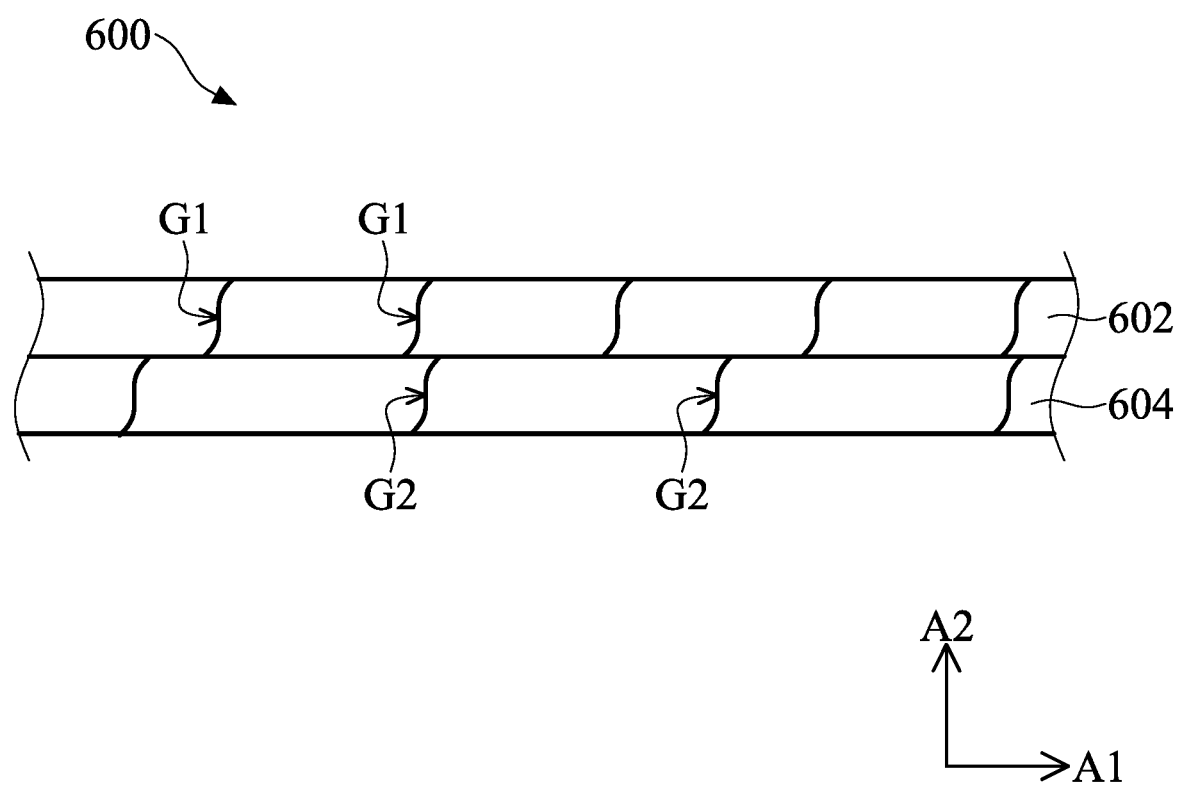
FIG. 7 is a partial cross-sectional view of the magnetic conductive substrate according to an embodiment of the present disclosure.
Figure 8:
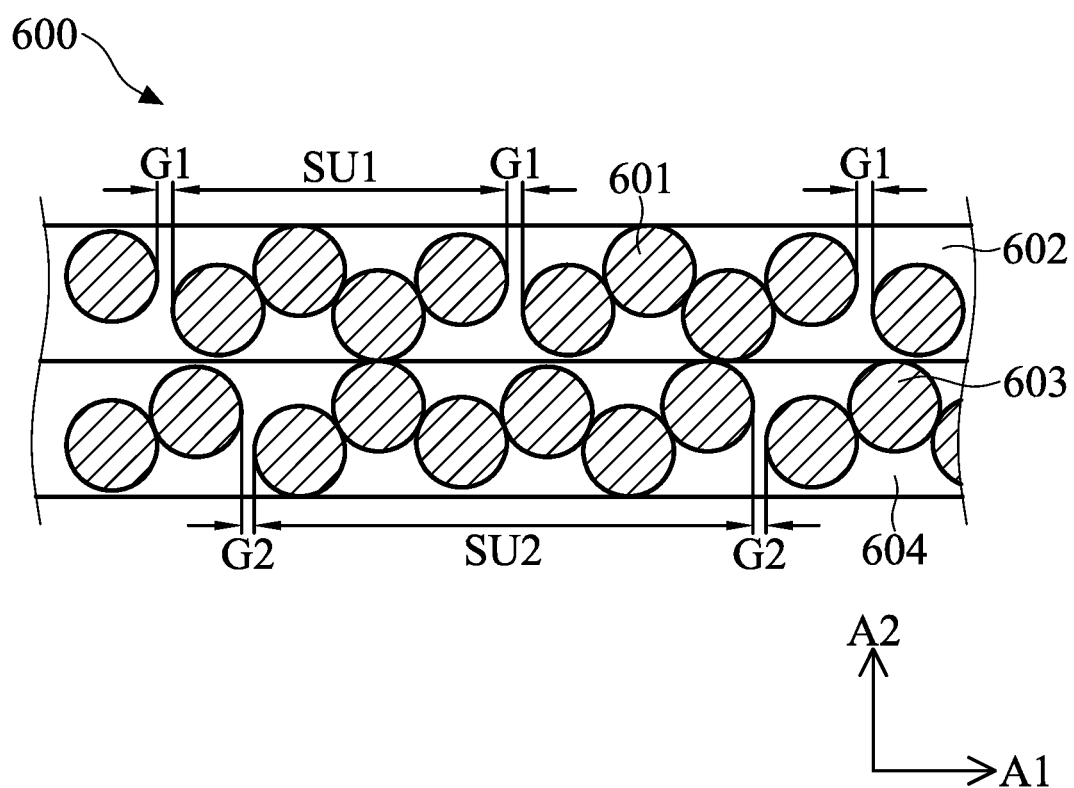
FIG. 8 is an enlarged cross-sectional view of the magnetic conductive substrate according to an embodiment of the present disclosure.

Please refer to FIG. 6 to FIG. 8. FIG. 6 is a top view of a magnetic conductive substrate 600 according to an embodiment of the present disclosure. FIG. 7 is a partial cross-sectional view of the magnetic conductive substrate 600 according to an embodiment of the present disclosure. FIG. 8 is an enlarged cross-sectional view of the magnetic conductive substrate 600 according to an embodiment of the present disclosure. Only a first magnetic conductive layer 602 and a second magnetic conductive layer 604 similar to the first magnetic conductive layer 202 and the second magnetic conductive layer 204 are shown in FIG. 6 to FIG. 8.

In the process of manufacturing the magnetic conductive substrate 600, the magnetic conductive layer is pressed to generate a plurality of gaps. The magnetic permeability of each of the magnetic conductive layers can be changed by adjusting the positions of the gaps. As shown in FIG. 6 to FIG. 8, the first magnetic conductive layer 602 may have a plurality of first gaps G1, and the second magnetic conductive layer 604 may have a plurality of second gaps G2. Furthermore, as shown in FIG. 8, the first magnetic conductive layer 602 has a plurality of first magnetic conductive units 601, the second magnetic conductive layer 604 has a plurality of second magnetic conductive units 603, and the first magnetic conductive units 601 and the second magnetic conductive units 603 may be a nano grains. A first magnetic conductive unit SU1 may be defined between two adjacent first gaps G1, and a second magnetic conductive unit SU2 may be defined by the two adjacent second gaps G2. That is, the first magnetic conductive layer 602 may have a plurality of first magnetic conductive units SU1, and the second magnetic conductive layer 604 may have a plurality of second magnetic conductive units SU2.

In this embodiment, the first magnetic conductive layer 602 and the second magnetic conductive layer 604 extend along an extending direction A1, and the average size of the first magnetic conductive units SU1 is different from the average size of the second magnetic conductive units SU2 in the extending direction A1. Specifically, as shown in FIG. 8, the average size of the second magnetic conductive units SU2 is larger than the average size of the first magnetic conductive units SU1.

In addition, it should be noted that, as shown in FIG. 6 to FIG. 8, a thickness direction A2 is defined by the first magnetic conductive layer 602 and the second magnetic conductive layer 604, and the thickness direction A2 is perpendicular to the extending direction A1. When viewed along the thickness direction A2 (FIG. 6), the first gaps G1 and the second gaps G2 are arranged in a staggered manner. Based on this configuration, the problem of magnetic leakage of the magnetic conductive substrate 600 can be avoided.

Figure 9:
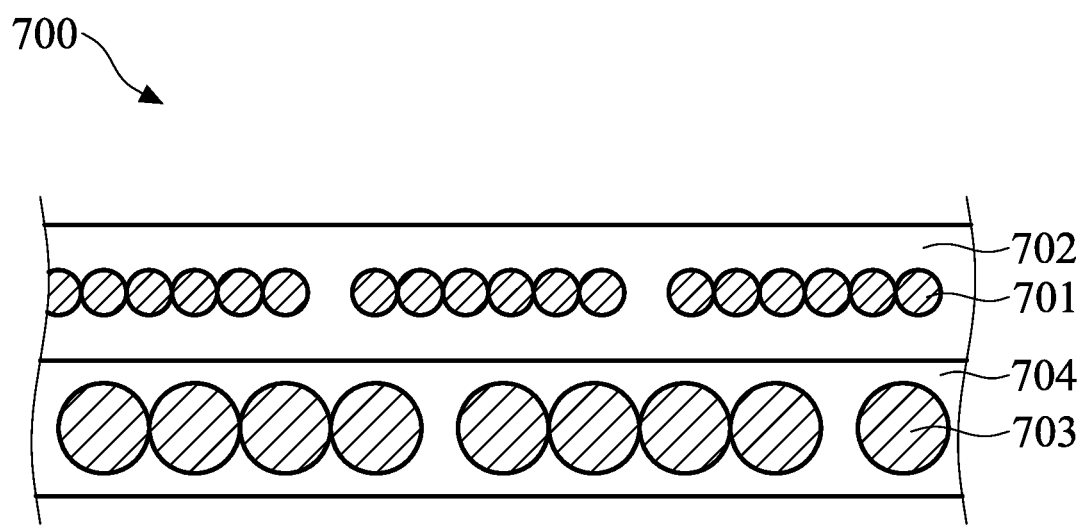
FIG. 9 is a partial enlarged diagram of a magnetic conductive substrate according to an embodiment of the present disclosure.

Please refer to FIG. 9, which is a partial enlarged diagram of a magnetic conductive substrate 700 according to an embodiment of the present disclosure. A first magnetic conductive layer 702 and a second magnetic conductive layer 704 in FIG. 9 are similar to the first magnetic conductive layer 602 and the second magnetic conductive layer 604. As shown in FIG. 9, the first magnetic conductive layer 702 and the second magnetic conductive layer 704 respectively have a plurality of first magnetic conductive units 701 and a plurality of second magnetic conductive units 703.

In this embodiment, the first magnetic conductive unit 701 and the second magnetic conductive unit 703 are nano grains with different sizes, and the distribution density of the first magnetic conductive units 701 is different from the distribution density of the second magnetic conductive units 703. Based on the structural design of this embodiment, when the distribution density of the nano grains in the magnetic conductive layer is adjusted, the magnetic permeability of each of the magnetic conductive layers can be changed.

Figure 10:
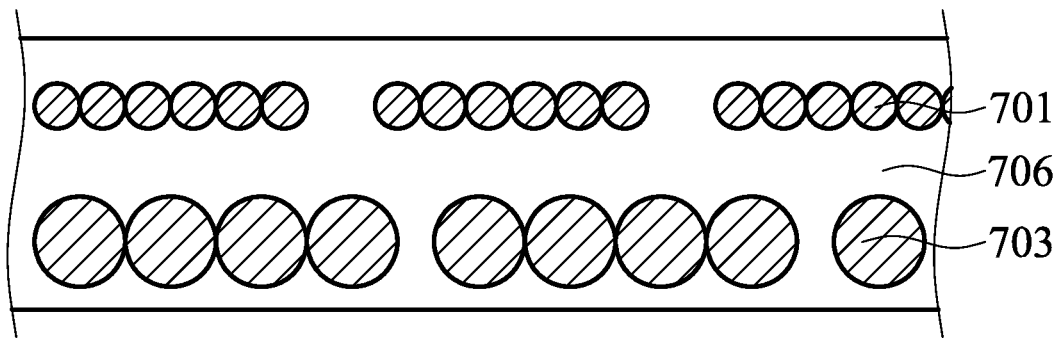
FIG. 10 is a partial enlarged diagram of a magnetic conductive layer according to an embodiment of the present disclosure.

Please refer to FIG. 10, which is a partial enlarged diagram of a magnetic conductive layer 706 according to an embodiment of the present disclosure. The first magnetic conductive layer 702 and the second magnetic conductive layer 704 of the foregoing embodiment may also be integrally formed, so as to form the magnetic conductive layer 706 shown in FIG. 10. Therefore, the first magnetic conductive units 701 and the second magnetic conductive units 703 with different sizes may be included in the same magnetic conductive layer 706, and the distribution densities of the first magnetic conductive units 701 and the second magnetic conductive units 703 are different.

In summary, the present disclosure provides a magnetic conductive substrate having three or more magnetic conductive layers, and the magnetic permeability of each of the magnetic conductive layers can be designed to be different. When the magnetic conductive layers having different magnetic permeabilities are stacked into a magnetic conductive substrate, the magnetic permeability of the entire magnetic conductive substrate can be arbitrarily adjusted according to requirements. With this design, the magnetic conductive substrate having a specific magnetic permeability can be implemented by simply using the magnetic conductive layers with different magnetic permeabilities, without additionally using a more complicated process to implement the magnetic conductive substrate. Therefore, the process can be simplified and the production cost can be reduced.

In addition, in the process of manufacturing the magnetic conductive substrate, the magnetic conductive layer is pressed to generate a plurality of gaps. By adjusting the positions of the gaps, the magnetic permeability of each of the magnetic conductive layers can be changed, and the magnetic permeability of the entire magnetic conductive substrate can be adjusted. Furthermore, the gaps of the different magnetic conductive layers are arranged in a staggered manner, so that the problem of magnetic leakage of the magnetic conductive substrate can be avoided.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A magnetic conductive substrate, for wireless charging or wireless communication, wherein the magnetic conductive substrate comprises:
a first magnetic conductive layer, having a first magnetic permeability; and
a second magnetic conductive layer, having a second magnetic permeability, wherein the first magnetic permeability is different from the second magnetic permeability;
wherein the magnetic conductive substrate further comprises a third magnetic conductive layer, having a third magnetic permeability, wherein the second magnetic conductive layer is disposed between the first magnetic conductive layer and the third magnetic conductive layer, the first magnetic permeability is different from the second magnetic permeability, and the second magnetic permeability is different from the third magnetic permeability;
wherein each of the first magnetic permeability, the second magnetic permeability, and the third magnetic permeability range from 800 to 1200;
wherein the second magnetic permeability is smaller than each of the first magnetic permeability and the third magnetic permeability, and the first magnetic permeability is equal to the third magnetic permeability.

2. The magnetic conductive substrate as claimed in claim 1, wherein the first magnetic conductive layer has a plurality of first gaps, the second magnetic conductive layer has a plurality of second gaps, wherein a thickness direction is defined by the first magnetic conductive layer, and when viewed along the thickness direction, the first gaps and the second gaps are arranged in a staggered manner.

3. The magnetic conductive substrate as claimed in claim 1, wherein the first magnetic conductive layer has a plurality of first magnetic conductive units, and the second magnetic conductive layer has a plurality of second magnetic conductive units, wherein an extending direction is defined by the first magnetic conductive layer and the second magnetic conductive layer, and an average size of the first magnetic conductive units is different from an average size of the second magnetic conductive units in the extending direction.

4. The magnetic conductive substrate as claimed in claim 1, wherein the first magnetic conductive layer has a plurality of first magnetic conductive units, the second magnetic conductive layer has a plurality of second magnetic conductive units, and a distribution density of the first magnetic conductive units is different from a distribution density of the second magnetic conductive units.

5. The magnetic conductive substrate as claimed in claim 4, wherein the first magnetic conductive layer and the second magnetic conductive layer are made of different materials.

6. The magnetic conductive substrate as claimed in claim 1, wherein each of the first magnetic permeability, the second magnetic permeability, and the third magnetic permeability range from 800 to 850.

7. The magnetic conductive substrate as claimed in claim 1, wherein thickness of the first magnetic conductive layer is less than 50 µm, thickness of the second magnetic conductive layer is less than 50 µm, and thickness of the third magnetic conductive layer is less than 50 µm.

8. A coil assembly, comprising:
a magnetic conductive substrate, for wireless charging or wireless communication, and the magnetic conductive substrate comprising:
a first magnetic conductive layer, having a first magnetic permeability; and
a second magnetic conductive layer, having a second magnetic permeability; and
a coil, disposed on the first magnetic conductive layer, wherein the first magnetic permeability is different from the second magnetic permeability;
wherein the magnetic conductive substrate further comprises a third magnetic conductive layer, having a third magnetic permeability, wherein the second magnetic conductive layer is disposed between the first magnetic conductive layer and the third magnetic conductive layer, the first magnetic permeability is different from the second magnetic permeability, and the second magnetic permeability is different from the third magnetic permeability;

wherein each of the first magnetic permeability, the second magnetic permeability, and the third magnetic permeability range from 800 to 1200;

wherein the second magnetic permeability is greater than each of the first magnetic permeability and the third magnetic permeability, and the first magnetic permeability is equal to the third magnetic permeability.

9. The coil assembly as claimed in claim 8, wherein the magnetic conductive substrate is made of a nanocrystalline material or ferrite.

10. The coil assembly as claimed in claim 8, wherein the magnetic conductive substrate further includes a plurality of adhesive layers, and the first, second and third magnetic conductive layers are connected to each other by the adhesive layers.

11. The coil assembly as claimed in claim 8, wherein the first magnetic conductive layer has a plurality of first magnetic conductive units, and the second magnetic conductive layer has a plurality of second magnetic conductive units, wherein the first magnetic conductive layer and the second magnetic conductive layer define an extending direction, and an average size of the first magnetic conductive units is different from an average size of the second magnetic conductive units in the extending direction.

12. The coil assembly as claimed in claim 8, wherein the first magnetic conductive layer has a plurality of first magnetic conductive units, the second magnetic conductive layer has a plurality of second magnetic conductive units, and a distribution density of the first magnetic conductive units is different from a distribution density of the second magnetic conductive units.

13. The coil assembly as claimed in claim 8, wherein the first magnetic conductive layer has a plurality of first gaps, and the second magnetic conductive layer has a plurality of second gaps, wherein the first magnetic conductive layer defines a thickness direction, and when viewed along the thickness direction, the first gaps and the second gaps are arranged in a staggered manner.

14. A coil assembly, comprising:
a magnetic conductive substrate, for wireless charging or wireless communication, and the magnetic conductive substrate comprising:
a first magnetic conductive layer, having a first magnetic permeability; and
a second magnetic conductive layer, having a second magnetic permeability; and
a coil, disposed on the first magnetic conductive layer, wherein the first magnetic permeability is different from the second magnetic permeability;
wherein the magnetic conductive substrate further comprises a third magnetic conductive layer, having a third magnetic permeability, wherein the second magnetic conductive layer is disposed between the first magnetic conductive layer and the third magnetic conductive layer, the first magnetic permeability is different from the second magnetic permeability, and the second magnetic permeability is different from the third magnetic permeability;
wherein each of the first magnetic permeability, the second magnetic permeability, and the third magnetic permeability range from 800 to 1200;
wherein the third magnetic permeability is greater than each of the first magnetic permeability and the second magnetic permeability, and the second magnetic permeability is greater than the first magnetic permeability.

* * * * *